US011564183B2

(12) United States Patent
Hakola et al.

(10) Patent No.: US 11,564,183 B2
(45) Date of Patent: Jan. 24, 2023

(54) SCHEDULING BEAM SWEEPING RESOURCE FOR TRANSMITTING CONTROL INFORMATION FOR WIRELESS NETWORKS

(71) Applicant: NOKIA TECHNOLOGIES OY, Espoo (FI)

(72) Inventors: Sami-Jukka Hakola, Kempele (FI); Jorma Johannes Kaikkonen, Oulu (FI); Esa Tapani Tiirola, Kempele (FI); Lars Dalsgaard, Oulu (FI); Samuli Heikki Turtinen, Ii (FI); Juho Mikko Oskari Pirskanen, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/482,031

(22) PCT Filed: Feb. 6, 2018

(86) PCT No.: PCT/EP2018/052876
§ 371 (c)(1),
(2) Date: Jul. 30, 2019

(87) PCT Pub. No.: WO2018/141981
PCT Pub. Date: Aug. 9, 2018

(65) Prior Publication Data
US 2019/0380099 A1  Dec. 12, 2019

Related U.S. Application Data

(60) Provisional application No. 62/455,254, filed on Feb. 6, 2017.

(51) Int. Cl.
*H04W 56/00* (2009.01)
*H04B 7/0408* (2017.01)
(Continued)

(52) U.S. Cl.
CPC ........ *H04W 56/001* (2013.01); *H04B 7/0408* (2013.01); *H04B 7/0617* (2013.01);
(Continued)

(58) Field of Classification Search
CPC ...... H04B 7/0408; H04B 7/088; H04B 7/043; H04B 7/0617; H04L 41/028;
(Continued)

(56) References Cited

U.S. PATENT DOCUMENTS

| 2011/0075621 A1 | 3/2011 | Sung et al. |
| 2013/0053078 A1 | 2/2013 | Barbieri et al. |

(Continued)

FOREIGN PATENT DOCUMENTS

| CN | 1402914 A | 3/2003 |
| CN | 104104424 A | 10/2014 |

(Continued)

OTHER PUBLICATIONS

R1-167707, "Initial performance evaluation of different beamforming options for NR synchroniozation signals", Aug. 22-26, 2016, pp. 1-6 (Year: 2016).*

(Continued)

*Primary Examiner* — Salvador E Rivas
(74) *Attorney, Agent, or Firm* — Brake Hughes Bellermann LLP

(57) ABSTRACT

A technique includes receiving a plurality of synchronization signal blocks, including synchronization signals and beam specific reference signals, receiving a plurality of beam sweeping scheduling blocks, each beam sweeping scheduling block corresponding to one of the synchronization signal blocks and including scheduling information to schedule a dynamic size beam sweeping resource (e.g., mini-slot or other resource) for transmission of common control information (e.g., paging data and/or system information or SIB) via a set of one or more beams, and selecting, based on a measurement of signals of at least one of the synchronization signal blocks and the scheduling information, one of the dynamic size beam sweeping resources (e.g., one of the beam sweeping mini-slots or other resource) to receive the common control information (e.g., paging data and/or system information or SIB).

19 Claims, 7 Drawing Sheets

(51) Int. Cl.
  *H04B 7/06* (2006.01)
  *H04B 7/08* (2006.01)
  *H04W 16/28* (2009.01)
  *H04W 72/04* (2009.01)
  *H04W 72/12* (2009.01)
  *H04L 1/00* (2006.01)
  *H04B 7/0426* (2017.01)

(52) U.S. Cl.
  CPC ........... *H04B 7/088* (2013.01); *H04L 1/0027* (2013.01); *H04W 16/28* (2013.01); *H04W 72/0446* (2013.01); *H04W 72/12* (2013.01); *H04B 7/043* (2013.01)

(58) Field of Classification Search
  CPC .. H04L 1/0027; H04W 56/001; H04W 72/12; H04W 72/0446
  See application file for complete search history.

(56) References Cited

U.S. PATENT DOCUMENTS

| | | | | |
|---|---|---|---|---|
| 2016/0353467 | A1* | 12/2016 | Nekovee | H04B 7/0695 |
| 2016/0360463 | A1 | 12/2016 | Kim | |
| 2020/0404617 | A1* | 12/2020 | Murray | H04B 7/0695 |
| 2021/0084615 | A1* | 3/2021 | Priyanto | H04W 68/06 |

FOREIGN PATENT DOCUMENTS

| | | | |
|---|---|---|---|
| EP | 3297375 | A1 | 3/2018 |
| WO | 2016191994 | A1 | 12/2016 |

OTHER PUBLICATIONS

R1-167525 , "Beam Sweeping Design Issues in NR", Aug. 22-26, 2016, pp. 1-5 (Year: 2016).*
R1-162895, "Support for Beam Based Common Control Plane in 5G New Radio", Apr. 11-15, 2016, pp. 1-4 (Year: 2016).*
International Search Report and Written Opinion for International Application No. PCT/EP2018/052876, dated Jun. 1, 2018, 16 pages.
3GPP TR 38.801 V1.0.0 (Dec. 2016); 3rd Generation Partnership Project; Technical Specification Group Radio Access Network; Study on New Radio Access Technology; Radio Access Architecture and Interfaces (Release 14); Sophia Antipolis, Valbonne, France; Dec. 2012; 67 pages.
3GPP TSG-RAN WG2 Meeeting #96; Skeleton Report; ETSI MCC; Reno, Nevada, USA; Nov. 14-18, 2016; 119 pages.
3GPP TSG RAN WG1 Meeting #86; R1-167384; "Initial Performance Investigation of Hybrid Beamforming"; Gothenburg, Sweden; Aug. 22-26, 2016; 7 pages.
3GPP TS 36.300 V12.6.0 (Jun. 2015); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12); Sophia Antipolis, Valbonne, France; Jun. 2015; 254 pages.
Office Action for European Application No. 18706968.7, dated Mar. 24, 2021, 5 pages.
Office Action for Chinese Application No. 201880010279.8, dated Jul. 28, 2022, 19 pages.
Office Action for Chinese Application No. 201880010279.8; dated Dec. 22, 2021, 12 pages.

* cited by examiner

SCHEDULING BEAM SWEEPING RESOURCE FOR TRANSMITTING CONTROL INFORMATION FOR WIRELESS NETWORKS

CROSS-REFERENCE TO RELATED APPLICATIONS

This application is a national stage entry of International Application No. PCT/EP2018/052876, filed Feb. 6, 2018, entitled "MULTI-BEAM PAGING TECHNIQUES FOR WIRELESS NETWORKS" which claims the benefit of priority of U.S. Provisional Application No. 62/455,254, filed Feb. 6, 2017, both of which are hereby incorporated by reference in their entireties.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. The 3GPP organization is developing a new radio system (commonly referred to as NR or 5th Generation/5G) to handle peak data rates of the order of ~10 Gbps (gigabits per second) while still satisfying ultra-low latency requirements in existence for certain 4G applications. 5G intends to utilize radio spectrum on the order of GHz or more in the millimeter-wave (mmWave) band; and also to support massive MIMO (m-MIMO). In NR, base stations or access points (APs), may be referred to as gNBs.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, above 6 GHz. For fifth generation wireless systems (5G), an access architecture for deployment of cellular radio equipment employing mmWave radio spectrum has been proposed. Other example spectrums may also be used, such as cmWave radio spectrum (3-30 GHz).

MIMO (multiple input, multiple output) is an antenna technology for wireless communications in which multiple antennas are used at both the source (transmitter) and the destination (receiver) in order to reduce errors and/or improve data speed.

SUMMARY

According to an example embodiment, a method includes transmitting, by a base station to a user device in a wireless network, a synchronization signal block via a set of one or more beams, and transmitting, by the base station, a beam sweeping scheduling block corresponding to the synchronization signal block, via the set of one or more beams, the beam sweeping scheduling block scheduling a dynamic size beam sweeping resource for transmission of common control information via the set of one or more beams.

According to an example embodiment, an apparatus includes at least one processor and at least one memory including computer instructions, when executed by the at least one processor, cause the apparatus to: transmit, in a wireless network, a synchronization signal block via a set of one or more beams, and transmit a beam sweeping scheduling block corresponding to the synchronization signal block, via the set of one or more beams, the beam sweeping scheduling block scheduling a dynamic size beam sweeping resource for transmission of common control information via the set of one or more beams.

According to an example embodiment, a computer program product includes a computer-readable storage medium and storing executable code that, when executed by at least one data processing apparatus, is configured to cause the at least one data processing apparatus to perform a method including: transmitting, in a wireless network, a synchronization signal block via a set of one or more beams, and transmitting a beam sweeping scheduling block corresponding to the synchronization signal block, via the set of one or more beams, the beam sweeping scheduling block scheduling a dynamic size beam sweeping resource for transmission of common control information via the set of one or more beams.

According to an example embodiment, a method includes receiving a plurality of synchronization signal blocks, including synchronization signals and beam specific reference signals, receiving a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams, and selecting, based on a measurement of signals of at least one of the synchronization signal blocks and the scheduling information, one of the dynamic size beam sweeping resources to receive the common control information.

According to an example embodiment, an apparatus includes at least one processor and at least one memory including computer instructions, when executed by the at least one processor, cause the apparatus to: receive a plurality of synchronization signal blocks, including synchronization signals and beam specific reference signals, receive a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams, and select, based on a measurement of signals of at least one of the synchronization signal blocks and the scheduling information, one of the dynamic size beam sweeping resources to receive the common control information.

According to an example embodiment, a computer program product includes a computer-readable storage medium and storing executable code that, when executed by at least one data processing apparatus, is configured to cause the at least one data processing apparatus to perform a method including: receiving a plurality of synchronization signal blocks, including synchronization signals and beam specific reference signals, receiving a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams, and selecting, based on a measurement of signals of at least one of the synchronization signal blocks and the scheduling information, one of the dynamic size beam sweeping resources to receive the common control information.

The details of one or more examples of implementations are set forth in the accompanying drawings and the description below. Other features will be apparent from the description and drawings, and from the claims.

DETAILED DESCRIPTION

Figure 1:
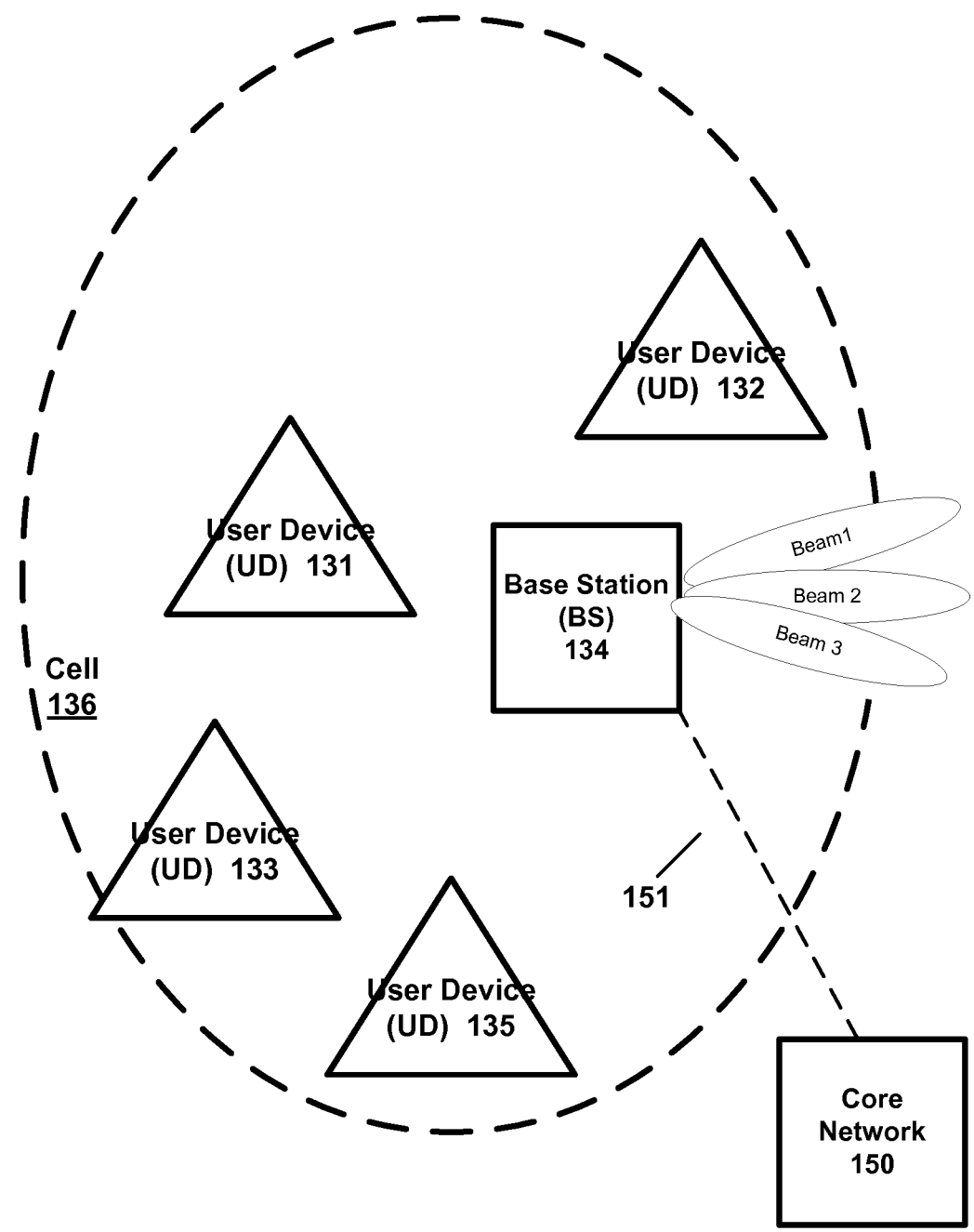
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, cmWave, and/or mmWave band networks, or any other wireless network. LTE, 5G, cmWave and mmWave band networks are provided only as illustrative examples, and the various example implementations may be applied to any wireless technology/wireless network.

Various example implementations may relate, for example, to 5G radio access systems (or other systems) with support for Massive MIMO (multiple input, multiple output) and optimized for operating in high carrier frequencies such as cmWave frequencies (e.g. from 3 GHz onwards) or mmWave frequencies, as examples, according to an illustrative example implementation. Those illustrative systems are typically characterized by the need for high antenna gain to compensate for increased pathloss and by the need for high capacity and high spectral efficiency to respond to ever increasing wireless traffic. According to an example implementation, the increased attenuation at higher carrier frequencies may, for example, be compensated by introducing massive (multi-element) antenna arrays and correspondingly antenna gain via beamforming at the access point (AP)/base station (BS) and/or user device. The spectral efficiency may typically improve with the number spatial streams the system can support and thus with the number of antenna ports at the BS. According to an example implementation, spatial multiplexing may include a transmission technique in MIMO wireless communication to transmit independent and separately encoded data signals, so-called streams, from each of the multiple transmit antennas.

For example, for massive multiple input multiple output (M-MIMO) system, a large number of antenna elements may typically be used at a transmitter and/or receiver (e.g., at a base station/access point or other network node). M-MIMO may typically have more spatial links/layers and provides more spatial degrees of freedom. In an illustrative example, with well designed antenna weights, a MIMO or M-MIMO transmitter can generate relatively narrow beams with good spatial separation. Thus, such a transmitter can achieve greater beamforming gain, reduce the spatial interference range and obtain greater multiple user spatial multiplexing gain. A MIMO or M-MIMO system may typically have better performance in terms of data rate and link reliability compared with other systems.

For example, as shown in FIG. 1, to cover a cell, multiple beams are needed. However, in many cases, only a subset of beams can be active at the same time, e.g., to reduce cost and complexity. Different transceiver architectures may be used for 5G radio access system: digital, analogue or so-called hybrid, which utilizes a hybrid of digital baseband processing (such as MIMO Multiple Input Multiple Output and/or digital precoding). Various example implementations may be applicable to analogue beamforming (fully analogue or hybrid transceiver) and/or to digital beamforming transceiver architecture.

According to an example implementation, to compensate for the increased path loss when operating on higher frequencies, beamforming is important for providing cell coverage. The aforementioned transceiver architectures allows for implementing beam forming in 5G radio systems depending on the cost and complexity limitations. As an example, systems deployed to lower frequencies (~sub 6 GHz) may be implemented by using fully digital architecture, and the higher frequencies where the number of antenna elements required for cell coverage may range from tens to hundreds may be implemented by using hybrid-architecture, or even fully analogue architecture.

According to an example implementation, radio systems may support a conventional single beam (sector-wide beam) and multi-beam (beam sweeping using beams that are narrower than sector-wide beams) transmission approaches for downlink control signaling.

According to an example implementation, a BS/eNB may use beam sweeping to transmit information (e.g., control information) over an entire cell. As noted, a beam may cover only a small area, and the BS may be able to activate only a relatively small number (e.g., 1, 2, 4, 6, 8) of beams at a time. A total number of beams required to cover required cell area is typically much larger than the number of concurrent active beams the BS/AP is able to form at a time. Therefore, BSs/APs need to sweep through the cell coverage area in time domain by activating different sets of beams.

According to an example implementation, a slot (which may be the same as or similar to a subframe) may correspond to a regular scheduling unit in time, and in various example embodiments one slot may run 7, 14, 21 or 28 symbols, as examples. The length of the slot may define for example the granularity for link direction switching. A mini-slot would provide a smaller scheduling unit in time as compared to a slot, and for example a mini-slot may consist of one or a few symbols in time. Mini-slot-based operation may be based on predefined mini-slot length(s) and predefined starting position(s). Mini-slot length and starting position of mini-slot may be semi-statically configured. Another option is to support dynamic selection of the mini-slot length and starting position. Mini-slot may be seen as PDSCH (physical downlink shared channel, which may be a data channel) shortened from the end. DL (downlink) mini-slot may or may not contain control portion during the first symbol(s) of the mini-slot.

According to an example implementation, beam sweeping (sweeping slot or synchronization signal-burst (SS-burst)) may be used to provide coverage for common control channel signaling with beam forming. Sweeping slot/SS-burst may include synchronization signal blocks (SSBs), where a single SS block covers a specific area of the cell with a set of one or more active beams. Therefore, a BS may need to sweep through the cell coverage area in time domain by activating different sets of beams on each SSB, e.g., in order to transmit the common control channel signaling across the cell. A synchronization signal block (SSB) may include synchronization signals (SS), including primary synchronization signals and secondary synchronization signals, a physical broadcast channel (e.g., including system information such as system frame number, system bandwidth), cell specific reference signals, and beam-specific reference signals (e.g., to identify each beam). Within a SSB, the synchronization signals (SS), PBCH and cell specific references signals are the same for all beams, but the beam specific reference signals change for each active beam(s) for the transmission of the SSB.

Thus, beam sweeping may be performed to generate or activate each of a plurality of sets of beams in the time domain in order to transmit signals across a cell. For example, only one beam may be active, or a set of beams (e.g., 3 beams, 4 beams, 6 beams, or some other number of beams) may be active at a time. Various control signals, such as synchronization signals (SSs), beam-specific reference signals (RSs), Physical broadcast channel (PBCH), PBCH demodulation reference signals (PBCH-DMRS), Channel State Information Reference Signals (CSI-RS), Beam specific CSI-RS, Mobility Reference Signals (MRS) etc., may be transmitted by BS 134 for typically only one set of beams or for one SS block at a time. Thus, one set of beams for a SS block (SSB1) is shown for the BS 134, including beam 1, beam 2, and beam 3, as an illustrative example. Other sets of beams for other SS blocks may also be provided by BS 134. BS 134 may sweep across each beam or across each set of beams or SS block, for example. Thus, SS block 1 (SSB1 may include a synchronization signals, PBCH, and other signals, transmitted at the same time on each of beam 1, beam 2 and beam 3, for example). Synchronization signals may be transmitted for other SS blocks as the BS 134 sweeps around to other beams. Additionally, a SS block may include beam specific reference signals enabling UE to distinguish and measure different beams in a specific SS block. In one example the different signals of an SS block may transmitted in different manner: SS/PBCH or other signals may be transmitted using all the beams of an SS block while beam specific signals are transmitted using individual beams.

According to an example implementation, a user device 132 may measure each of a plurality of beams and determine a best or preferred downlink (DL) transmit beam/SS block that was applied by the BS 134. For example, the user device may measure a signal strength, amplitude or other signal characteristic for each of the beam or non-beam-specific signals (e.g., reference signals, synchronization signals (e.g. SS), or other control signals), and then may determine the best DL (downlink) transmit beam or alternatively best SS block. According to an example implementation, the user device 132 may send a beam report to the BS 134 to indicate a best or preferred beam, or a best or preferred set of beams or the best or preferred SS-block, for example. The BS 134 may then use such identified preferred beam(s) to transmit to the user device 132.

Figure 2:
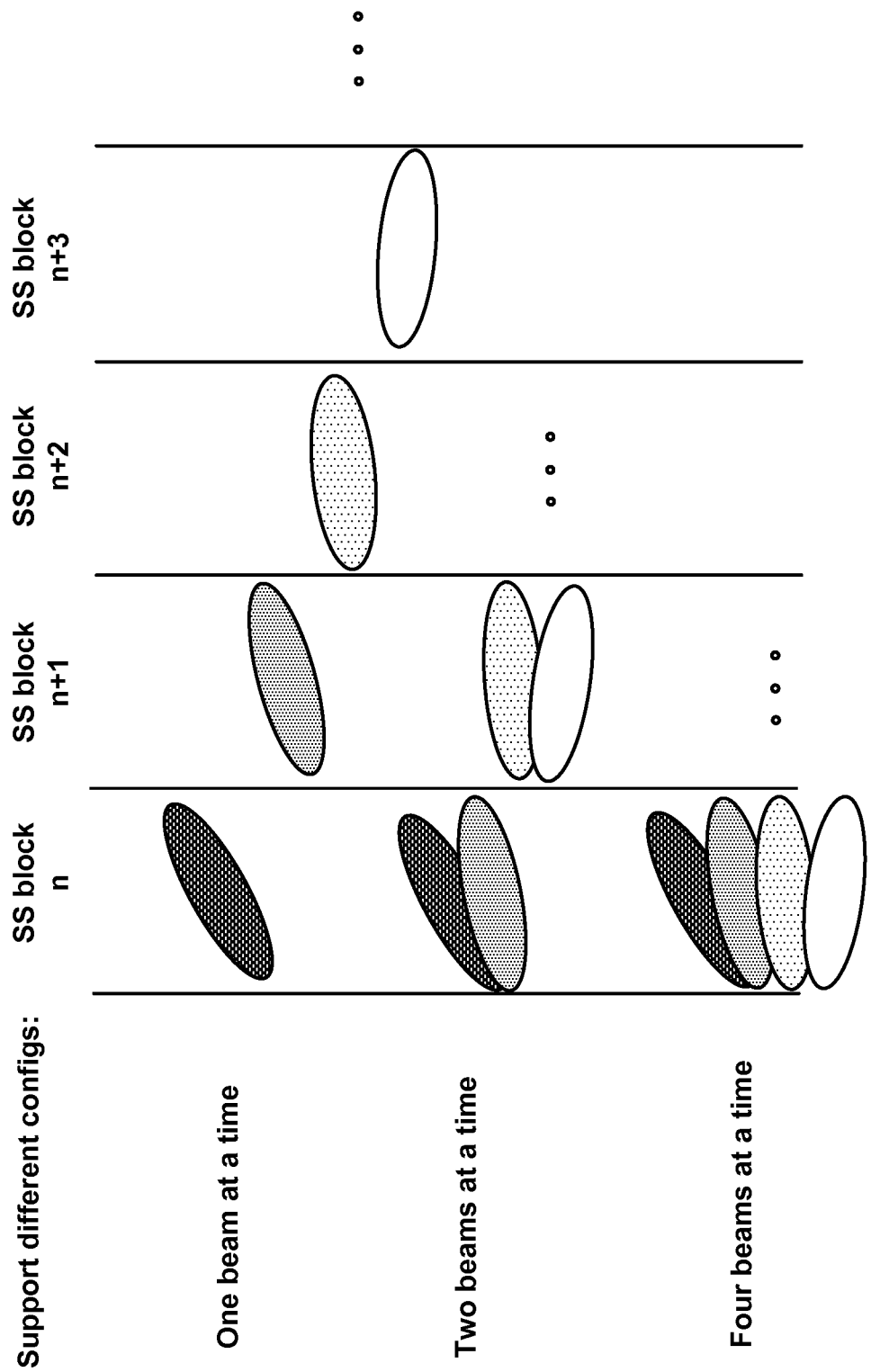
FIG. 2 is a diagram illustrating the use of beam sweeping to transmit information according to an example implementation.

FIG. 2 is a diagram illustrating the use of beam sweeping to transmit information according to an example implementation. In the example shown in FIG. 2, multi-beam, using beam sweeping, may be used to transmit synchronization signal blocks (SSB) using different multi-beam configurations, e.g., for SSB n, SSB n+1, SSB n+2, SSB n+3, etc. The transmission of a consecutive group SSBs are shown in FIG. 2, for different beam configurations. For example, SSBs may be transmitted one beam at a time, two beams at a time, four beams at a time, etc. More beams (or a different number of beams) may be used per transmission, such as 8 beams, 16, beams, etc.

Figure 3:
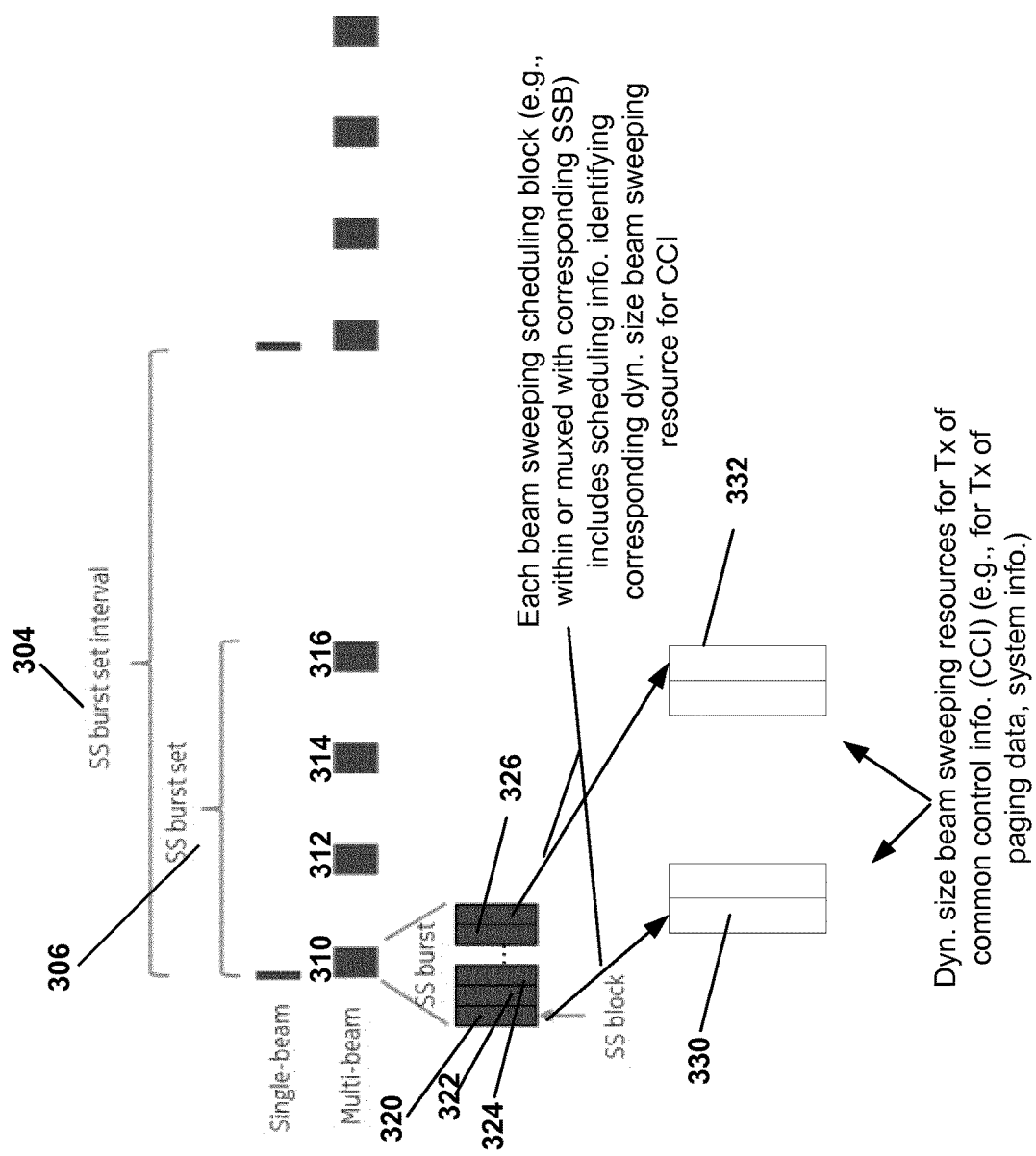
FIG. 3 is a diagram illustrating transmission of a synchronization signal (SSB) burst and synchronization signal block using multi-beam according to an example implementation.

FIG. 3 is a diagram illustrating transmission of a synchronization signal (SSB) burst and synchronization signal block(s) (SSBs) using multi-beam according to an example implementation. As shown in FIG. 3, a SS burst set interval 304 may include a SS burst set 306 for multi-beam that includes a plurality of SS bursts, such as SS burst 310, SS burst 312, SS burst 314, SS burst 316. Each SS burst may include a plurality of SS blocks (SSBs). For example, SS burst 310 may include SSB 320, SSB 322, SSB 324, SSB 326, etc. Each SSB may be transmitted via a set of one or more beams. For example, SSB 320 may be transmitted via beams 1, 2, 3; SSB 322 may be transmitted via beams 4, 5, 6; SSB 324 may be transmitted via beams 7, 8 and 9, SSB 326 transmitted via beams 10, 11, and 12, etc.

In addition, a beam sweeping scheduling block (e.g., which may be part of a sweeping downlink control channel) may be transmitted either as part of a corresponding SSB, or multiplexed (e.g., frequency division multiplexed or time division multiplexed) with a corresponding SSB. Thus, there may be a beam sweeping scheduling block for each SSB, according to an illustrative example implementation. Thus, there may be an association or correspondence of one beam sweeping scheduling block per SSB. Alternatively, there may be a correspondence of one beam sweeping scheduling block per SS burst, or per SS burst set. Alternatively, there may be association or correspondence of one beam sweeping scheduling block per one or more beams but not correspondence per SSB, SS burst, or per SS burst set. Each beam sweeping scheduling block may schedule (or may include scheduling information to identify) a beam sweeping resource (e.g., beam sweeping mini-slot) for transmission of common control information (e.g., such as paging data and/or system information or a system information block (SIB) or a group of system information blocks) via the same set of one or more beams that were used to transmit the SSB and corresponding beam sweeping scheduling block.

The transmission of beam sweeping scheduling block enables utilization of variable number of symbols and subcarriers to be used for beam sweeping resources for transmitting variable amount of data. The data can be from different higher layer common control channels such PDCCH (physical downlink control channel) carrying paging messages, and BCCH (broadcast control channel) carrying different system information blocks (SIB), that can be multiplexed into single beam sweeping resources based on beam sweeping scheduling block information. The beam sweeping scheduling block, may use separate downlink control information (DCI) for different higher layer common control data. The DCI transmission processing can be same as used for PDCCH. A same beam sweeping scheduling block may be used to schedule both: 1) a dynamic size beam sweeping resource for paging and 2) a dynamic size beam sweeping resource for system information. These may be frequency or time domain multiplexed with each other. This technique may save some overhead as no dedicated scheduling block sweep would be needed for both separately.

Each beam sweeping scheduling block, corresponding to an SSB, may be transmitted by a BS/eNB via the set of one or more beams that are the same as the set of one or more beams used to transmit the corresponding SSB. Thus, for example, if an SSB is transmitted via beams 5 and 6, then the corresponding beam sweeping scheduling block, and the common control information, may also be transmitted via the same beams 5, 6. Thus, the common control information transmitted via beams 5 and 6 would be, for example, transmitted via the beam sweeping resource/mini-slot indicated in the corresponding beam sweeping scheduling block.

Thus, a UE may detect and/or decode, and then measure, received synchronization signals (SS) and/or reference signals (RS) received via one or more SSBs, and then select a best SSB and select a best beam, based on received signal strength or signal quality of the received SS or RS of the SSB. Then, the UE may determine a location of the beam sweeping resource to receive the common control information (e.g., paging data and/or system information) based on the scheduling information within the corresponding (corresponding to the SSB that was received and measured) beam sweeping scheduling block (where the corresponding beam sweeping scheduling block is transmitted via the same beam that is the best beam selected by the UE). The UE may then receive the common control information (e.g., paging data and/or system information) via the determined beam sweeping resource (e.g., beam sweeping mini-slot).

As shown in the illustrative example implementation of FIG. 3, each beam sweeping scheduling block (e.g., including within or muxed/multiplexed with a corresponding SSB) includes information identifying a corresponding dynamic size beam sweeping resource for the transmission of CCI (e.g., either paging data or system information). For example, SSB 320 (e.g., transmitted via beams 1, 2, 3) may include a beam sweeping scheduling block that schedules (or includes information identifying resources for) a corresponding dynamic size beam sweeping resource 330 (also transmitted via same beams 1, 2, 3) for the transmission of common control information (which may include, e.g., paging data and/or system information). Likewise, for example, SSB 326 (e.g., transmitted via beams 10, 11, and 12) may include a beam sweeping scheduling block that schedules (or includes information identifying resources for) a corresponding dynamic size beam sweeping resource 332 (also transmitted via same beams 10, 11, 12) for the transmission of common control information.

Thus, according to an example implementation, multi-beam configuration may be used for the downlink transmission of common control information, such as paging data (or paging information, such as paging messages) and or system information (which may be transmitted as a system information block (SIB)). Paging, for example, may be used for network-initiated connection setup when a UE/user device is in an idle state or inactive state (non-connected state) with respect to a cell or BS. For example, according to an example implementation, a paging mechanism may allow UEs to sleep in idle/inactive state (e.g., a in low power state, not connected to the BS/cell), and then briefly wakeup at a predefined time(s) like at paging occasions (PO) to monitor paging data (paging information).

In one illustrative example, for the system information transmission, at least the beam sweeping scheduling block may be transmitted in the system information scheduling window while the corresponding dynamic size beam sweeping resource may or may not be transmitted in the scheduling window. The scheduling window for a concerned system information block or a group of system information blocks may be indicated in the minimum system information.

Some example advantages of example implementations may include, for example: Actual higher layer common control data i.e. paging messages/paging data may be variable size so that with beam sweeping scheduling block we can enable variable size beam sweeping block, both frequency (number of subcarriers) and time (number of symbols). We can multiplex multiple type of data into beam sweeping block. Can be paging and SIBs and variable amount of these. Also UE can distinguish those from different Downlink Control information (DCI) content. So actually it (UE) can decide whether it needs to receive actual beam sweeping block. The DCI encoding can be similar as use for PDCCH, but bit content can be different.

Figure 4:
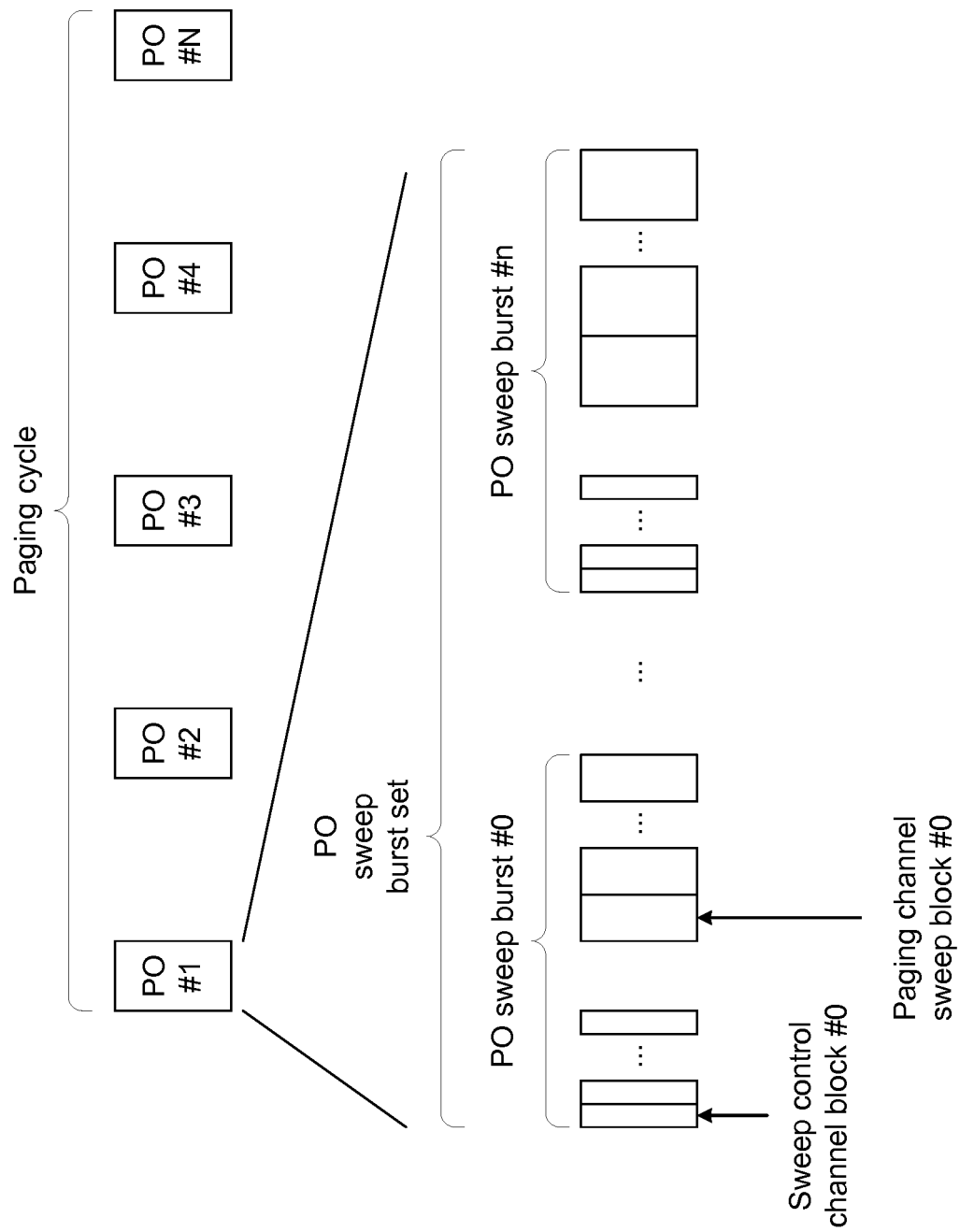
FIG. 4 is a block diagram illustrating a multi-beam paging according to another example implementation.

FIG. 4 is a block diagram illustrating a multi-beam paging according to another example implementation. A paging cycle is shown, including a number of paging occasions (POs), including PO #1, PO #2, PO #3, . . . PO #N. A PO sweep burst may be provided for each paging occasion, including PO sweep burst #0, . . . PO sweep burst #n. A number of beam sweeping scheduling blocks may be provided for each PO sweep burst. Each beam sweeping scheduling block corresponding to different PO sweep burst may schedule a different sized beam sweeping mini-slot for transmission of paging data, for example, as illustrated for PO sweep burst #0 and PO sweep burst #n in the FIG. 4. The size of the sweeping control channel may be predefined. In a typical scenario, the size is rather limited in order to minimize the overhead. The size of paging channel sweeping block may vary in time and frequency according to scenario. It's also possible to indicate the size dynamically as part of the sweeping control channel. According to an example implementation with respect to FIG. 4, within one PO (paging occasion), the beam sweeping scheduling block may schedule a different sized beam sweeping mini slot (or resource) for transmission of paging data, e.g., where the content size (of the paging data or other CCI) has changed. For example, between PO sweep bursts, the BS may receive a new request to page a UE whose ID matches with a current PO, and the BS may include the new UE ID to the paging message to be sent via paging data, which is shown as a larger paging channel sweep block for PO sweep burst #n.

Further details, according to various example implementations, will now be described.

For multi-beam operation, all the common signalling, i.e., targeting at idle, inactive, and connected state UEs, require beam sweeping operation over time domain. As an example, it may be considered that the cell has capability to form one (cross-polarized) beam at a time and to cover the sector's angular domain both in azimuth and vertical domains, 64 beams are needed in total. In that example case the gNB (e.g., 5G BS) needs 64 time units to transmit a common signalling via all 64 beams. Beam sweeping introduces a system overhead which should be taken into account when designing common control signalling methods for multi-beam configuration. According to an example implementation, a common sweeping block may be provided into which one can include or multiplex CCI, such as, e.g., synchronization signals, physical broadcast channel (PBCH), support for system information delivery and paging. According to an example implementation, a SS (synchronization signal) block may be provided that can carry at least synchronization signals (SS) and PBCH but may potentially also convey information related to paging and/or system information as well. Multiplexing signals and channels into a predefined block that is detectable for idle mode UEs as well means basically that channels capable of carrying data within SS block have fixed resource element allocation and payload sizes. However, it may be desirable to provide additional flexibility in the size of paging record list possibly even more. Such flexibility is in conflict with the small and fixed capacity size of a beam-swept physical broadcast channel. Therefore, it may be desirable to allow for accommodation of different sized resources for transmission of CCI (e.g., paging data and/or system information) for multi-beam configuration.

According to an example implementation, a mechanism is provided where beam sweeping scheduling blocks schedule dynamic (or variable) size sweeping mini-slots (or other resources) for the transmission of common control information (CCI), which may include paging data and/or system information or other CCI. For example, a sweeping DL control channel broadcasts (on each beam) the scheduled resources for the CCI, e.g., paging data; mini-slots (or other resources) may be allocated for the transmission of CCI such as paging data. Sweeping DL (downlink) control channel (including the beam sweeping scheduling blocks) communicates the resource allocation (indicating specific mini-slots) for transmission of CCI, such as paging data and/or system information blocks (SIBs).

A scheduling block may include resource elements (REs) for a physical channel (which may be referred to as a sweeping downlink control channel) and related demodulation reference signal(s). Depending on multiplexing with other signals and channels in the scheduling block, the reference signals for the physical channel may be some common reference signals used e.g. for PBCH (physical broadcast control channel) demodulation, beam detection, downlink synchronization. Transmission parameters (if control channel is muxed (multiplexed) within SS block—may have carrier frequency band specific SS block structures, at below 6 GHz a specific structure (control information spread over 4 or 6 symbols), and above 6 GHz (e.g., transmit (TX) this control information over only 2 OFDM symbols) a different SS block structure) may though be carrier frequency (range) specific meaning that e.g. multiplexing of sweeping downlink control channel with other signals and channels may be different from one carrier frequency (range) to another. As an illustrative example, transmission parameters (if control channel is multiplexed (muxed) within SS block) may have carrier frequency band specific SS block structures, at below 6 GHz a specific structure (e.g., common control information may be provided or spread over 4 or 6 symbols), and above 6 GHz (transmission of this common control information is provided over only 2 OFDM symbols). Also, for example, the UE search space defined for the sweeping downlink (DL) control channel may differ from the normal search space defined for DL control channel. For example, the sweeping DL control channel defined may have a specific REG (Resource element group)/CCE (Control channel element) structure and mapping, DMRS (demodulation reference signal) structure, supported CCE aggregation options, supported DCI payload sizes and so forth. For example, there may be just one payload option as well as one CCE aggregation level defined for the sweeping DL control channel.

Also, a couple of example options may include, e.g., 1) multiplexing the sweeping DL control channel into SS block; or another option, 2) Sweeping DL control channel is not muxed into SS block, but sweeping DL control channel would have same structure as SS block not resource allocation structure, but as many sweeping DL control channels (or as many beam sweeping scheduling blocks) as there are SS blocks but transmitted on a different channel, e.g., which may be TDM or FDM with corresponding SSB. Also, for example, the sweeping downlink control channel (or each beam sweeping scheduling block) may be SS block-specific, SS burst-specific or SS burst set-specific, or associated to multiple of SS bursts sets.

According to an example implementation, a BS/cell/ network controls the dependency (or association or correspondence) between sweeping downlink control channel (or each beam sweeping scheduling block) and SS block/burst/ burst set(s) and may configure the dependency or correspondence via system information transmitted to UEs. UE determines the dependency or correspondence from the system information and may attempt to combine downlink control channel transmissions as well as may attempt to combine the corresponding dynamic size beam sweeping resources, accordingly.

For SS block specific association, the UE may determine the scheduling information, e.g., for paging carried out in control channel SS block specific, i.e., for instance timing information of the channel carrying the paging data would be a function of the detected SS block. Thus, the sweeping DL (downlink) control channel within (or corresponding to) each SS block would schedule its own corresponding paging data or CCI. For example, sweeping DL control channel (or beam sweeping scheduling block) for beam 1 would include scheduling information for the transmission of paging data or other CCI for beam 1—for that beam or block). For example, sweeping DL control channel (beam sweeping scheduling block) could be within SS block; sweeping DL control channel could be muxed (multiplexed) with SS block but on different FDM or TDM resources (e.g., a different channel).

According to another example implementation, for a SS burst specific association with beam sweeping scheduling block (or sweeping DL control channel): UE can assume the same information for SS blocks of the same SS burst and can use this information to (soft-)combine control channel transmissions in the SS burst (UE can soft combine scheduling information received via two beams.) BS may virtualize these transmissions (DL sweeping control channel, and the paging data channel). For example, a UE may typically receive or see 1 TX per SS block—where BS transmitted the same signal for all 4 beams, and UE could combine these over multiple SS blocks. For example, the BS may sends one paging data scheduling information (beam sweeping scheduling block) with each SS block, and this scheduling information is transmitted over 4 beams (at a time) for each of the 3 SS blocks that are part of the SS burst. Furthermore, UE determines the scheduling information of paging data channel carried in control channel SS burst specific, i.e., for instance timing information of the channel carrying the paging data would be a function of the detected SS burst and data channels would be transmitted following the same time domain structure as SS burst. That means that there would be as many sweeping mini-slots as there are SS blocks within the SS burst. The duration of the sweeping mini-slot may be determined independently from the duration of the SS block. In one embodiment, the duration of the sweeping mini-slot is defined to be the same as the SS block carrying the scheduling information for paging data. The scheduling information (beam sweeping scheduling block) may indicate also the resource allocation per mini-slot. For instance, scheduling information (beam sweeping scheduling block) may indicate the start time of the sweeping mini-slot structure and size of each mini-slot within a sweep.

According to another example implementation, a SS burst set specific association may be provided with each beam sweeping scheduling block. UE can assume the same information for SS blocks in the SS burst set and can use this information to combine control channel transmission in the SS burst set. Scheduling information (beam sweeping scheduling block) that schedules or indicates resources for transmission of paging data may be a function of the SS burst structure, for example: Number of mini-slots maybe the same as SS blocks within the SS burst set. Alternatively, the control channel (beam sweeping scheduling block) may indicate explicitly different sweeping structure than used for SS blocks e.g. to enable cell to use different kind of beams (e.g., wider/or narrower beams) may be indicated for paging data channel than for SS blocks. Also, according to BS or network configuration, the beam sweeping scheduling block (that includes schedule or resource information for CCI or paging data) may be multiplexed (FDM/TDM) with the corresponding SS block(s) or transmitted separately. UE may determine the configuration from the system information.

According to another example implementation, scheduled mini-slots (for transmission of CCI, such as paging data and/or system information) may be allocated on the slots based on pre-determined rules such as one or more of the following example rules (or example techniques or approaches that may be used or applied): 1)-5) (by way of illustrative examples):

1) Mini-slots are not allocated upon normal downlink control channel region in the slot (assuming default downlink control channel region).

2) Mini-slots are not allocated over different slots.

3) In case of SS burst or SS burst specific control channel allocations, the timing of mini-slot allocation (for paging data) may follow SS burst timing in a way that UE can derive the starting point of mini-slot burst so that in case of the cell uses the same beams for SS blocks as for paging, the UE could in principle try to detect paging data message when the gNB/BS transmits paging from the strong DL beam the UE has detected and measured beforehand from earlier SS block transmissions; Sweeping DL control channel—including scheduling information for paging data for that beam—include the start time of mini-slot for paging data; sweeping mini-slots—similar beam sweeping structure; paging data—via a mini-slot, is transmitted (TX) via beam sweeping, e.g., which may be same as or similar to transmitting scheduling information for paging data.

4) Sweeping mini-slots of one sweep may occupy one or more (e.g., downlink (DL)) slots. gNB/BS may allocate DL data in a slot occupied partially by the sweeping mini-slots. This allocation may follow mini-slot based scheduling (e.g., rather than slot-based scheduling). And, 5) Sweeping mini-slots may or may not contain separate DL control channel portion. One or more of the following sub-rules may be provided or used, for example: No separate DL control channel portion: sweeping mini-slots are scheduled based solely on DL control channel portion of the SS block. This may be a sufficient solution for the case when there is enough space in the control channel region of the SS block to convey all the scheduling information related to sweeping mini-slots. Separate DL control channel portion included in the sweeping mini-slot: This can be seen as a form of two-stage scheduling of the sweeping mini-slot. A part of the scheduling information of the mini-slot (e.g. mini-slot timing) is conveyed in the SS block common to all sweeping mini-slots. The remaining part of the scheduling information is (FDM/TDM) multiplexed with DL data of the sweeping mini-slots. In both signaling solutions, part of the scheduling information (e.g., transmission scheme, or the number of transport blocks) related to DL data conveyed via sweeping mini-slots may be predefined by the standard.

In one exemplary implementation, the system information indicates UE the sweeping control channel structure. Alternatively, the UE may be signalled via dedicated signalling the system information for the cell. Assuming the sweeping control channel is multiplexed within SS block, the UE detects SS blocks of the cell and demodulates the sweeping control channel as part of the detected SS blocks. For instance, the cell may configure two SS bursts for the SS burst set where each SS burst has five SS blocks. The cell transmits signals and channels using N simultaneous transmit beams (N may be, e.g., 8). For example, synchronization signals may be virtualized to one-port transmission, PBCH and sweeping downlink control channel may be virtualized e.g. to two-port SFBC or two-port SFBC+precoder cycling transmission mode, and there may be per beam reference signal in the SS block for unique beam identification and measurement. From the sweeping control channel, the UE determines the resource allocation for the physical channel carrying the paging (or CCI) related payload. The control information indicates the UE the timing of the data channel transmitted using the same transmit beam(s) as the control channel. That enables that UE only tries to receive the data channel when the gNB/BS transmits using a strong DL beam from UE perspective.

While the various example implementations have been described (by way of illustrative example) for the radio access link (e.g., a radio link or connection between a UE and a BS), the various example implementations may be applicable for various types of radio links or connections, e.g., such as one or more (or multiple of) of: 1) a radio link between a user device (UE) and a BS; 2) a radio link between a UE and a relay node; 3) a radio link between a relay node and a BS; and/or 4) a radio link between a first relay node and a second relay node. According to an illustrative example implementation, a relay node may, e.g., communicate directly with a UE, and in some cases, may extend coverage of a BS, for example. For example, a wireless relay network may include a multi-hop system in which end nodes, such as UEs, may be coupled to a base station (BS) via one or more relay nodes. Thus, traffic (e.g., data or packets) between a UE and a BS may pass through and/or be processed by the relay node(s), for example. In some illustrative examples, a RN may appear as a UE to a donor BS, and the RN may also appear to be a BS to one or more UEs that are connected to or in communication with the RN. Thus, for example, an illustrative RN may, at least in some cases, include some UE functionality, and some BS functionality (e.g., software protocol stack) for performing at least some of the UE functions/operations and/or BS functions/operations.

Figure 5:
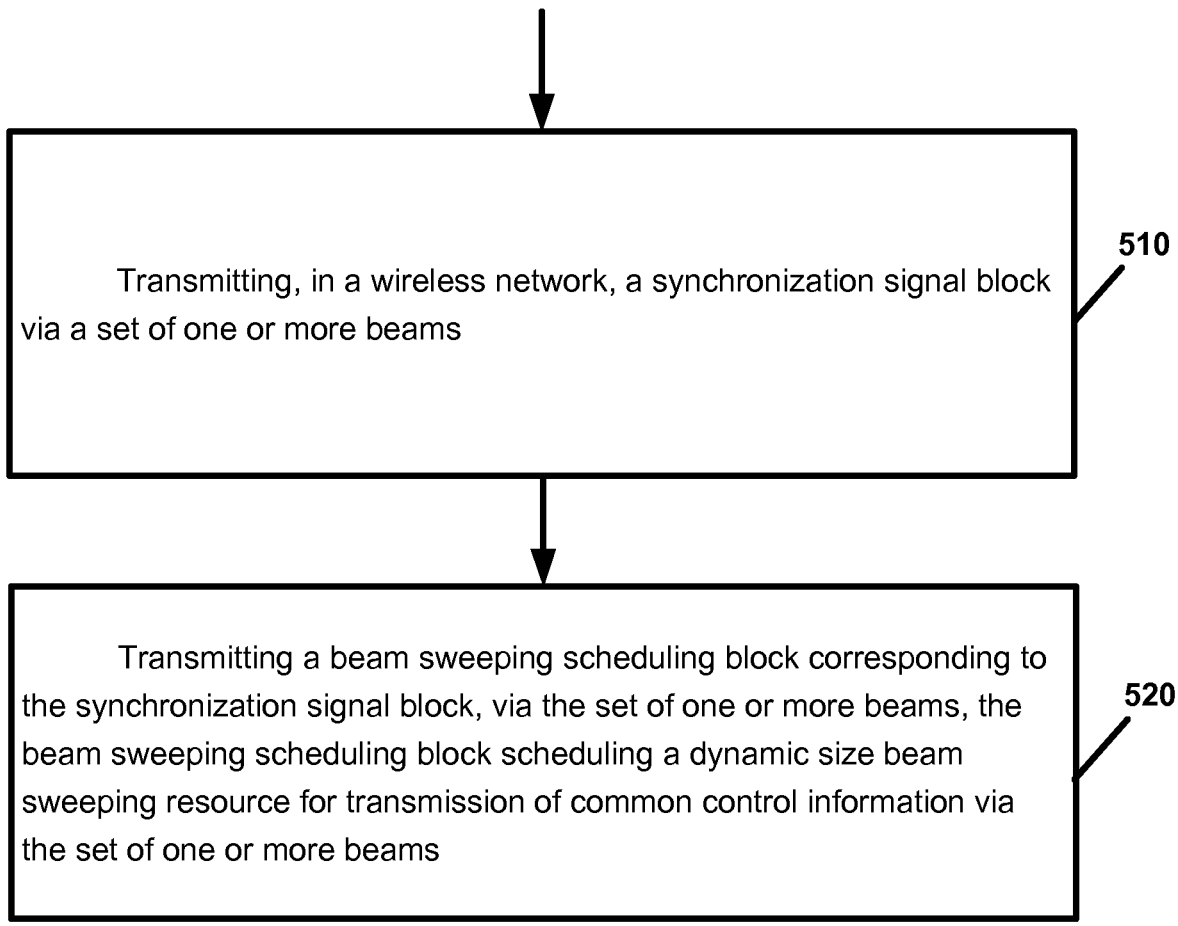
FIG. 5 is a flow chart illustrating operation of a node or device according to an example implementation.

Embodiment 1: FIG. 5 is a flow chart illustrating operation of a node or device according to an example implementation. Operation 510 includes transmitting, in a wireless network, a synchronization signal block via a set of one or more beams. And, operation 520 includes transmitting a beam sweeping scheduling block corresponding to the synchronization signal block, via the set of one or more beams, the beam sweeping scheduling block scheduling a dynamic size beam sweeping resource (e.g., a mini-slot or other resource) for transmission of common control information (e.g., paging data, and/or system information or SIB) via the set of one or more beams.

Embodiment 2: According to an example implementation of embodiment 1, wherein a presence of the dynamic size beam sweeping resource depends on the beam sweeping scheduling block.

Embodiment 3: According to an example implementation of any of embodiments 1-2, wherein the beam sweeping scheduling block, which corresponds to the synchronization signal block, is transmitted as part of the synchronization signal block, or is time division multiplexed or frequency division multiplexed with the synchronization signal block.

Embodiment 4: According to an example implementation of any of embodiments 1-3, wherein the synchronization signal block comprises at least synchronization signals and beam specific reference signals associated with each beam of the set of one or more beams.

Embodiment 5: According to an example implementation of any of embodiments 1-4, wherein the beam sweeping scheduling block is part of a sweeping downlink control channel.

Embodiment 6: According to an example implementation of any of embodiments 1-5, wherein the beam sweeping scheduling block comprises at least one of the following: information identifying the dynamic size beam sweeping resource; information identifying a start of the dynamic size beam sweeping resource; and information identifying a size of the dynamic size beam sweeping resource.

Embodiment 7: According to an example implementation of any of embodiments 1-6, and further comprising: transmitting, by a base station to a user device, the common control information via the set of one or more beams and the dynamic size beam sweeping resource.

Embodiment 8: According to an example implementation of any of embodiments 1-7, wherein the transmitting the synchronization signal block comprises transmitting a first synchronization signal block via a first set of one or more beams and a second synchronization signal block via a second set of one or more beams; and wherein the transmitting a beam sweeping scheduling block comprises: transmitting a first beam sweeping scheduling block corresponding to the first synchronization signal block, via the first set of one or more beams, the first beam sweeping scheduling block scheduling a first dynamic size beam sweeping resource (e.g., a first mini-slot or first resource) for transmission of common control information via the first set of one or more beams; and transmitting a second beam sweeping scheduling block corresponding to the second synchronization signal block, via the second set of one or more beams, the second beam sweeping scheduling block scheduling a second dynamic size beam sweeping resource (e.g., a second mini-slot or second resource) for transmission of common control information via the second set of one or more beams.

Embodiment 9: According to an example implementation of any of embodiments 1-8, wherein the common control information comprises at least one of: paging data; and system information.

Embodiment 10: According to an example implementation of any of embodiments 1-9, wherein the transmitting a synchronization signal block comprises at least one of the following: transmitting, by a base station to a user device in a wireless network, a synchronization signal block via a set of one or more beams; transmitting, by a base station to a relay node in a wireless network, a synchronization signal block via a set of one or more beams; transmitting, by a relay node to a user device in a wireless network, a synchronization signal block via a set of one or more beams; and transmitting, by a first relay node to a second relay node in a wireless network, a synchronization signal block via a set of one or more beams.

Embodiment 11: According to an example implementation of any of embodiments 1-10, wherein the transmitting a beam sweeping scheduling block comprises at least one of the following: transmitting, by a base station to a user device, a beam sweeping scheduling block corresponding to the synchronization signal block, via the set of one or more beams, the beam sweeping scheduling block scheduling a dynamic size beam sweeping resource for transmission of common control information via the set of one or more beams; transmitting, by a base station to a relay node, a beam sweeping scheduling block corresponding to the synchronization signal block, via the set of one or more beams, the beam sweeping scheduling block scheduling a dynamic size beam sweeping resource for transmission of common control information via the set of one or more beams; transmitting, by a relay node to a user device, a beam sweeping scheduling block corresponding to the synchronization signal block, via the set of one or more beams, the beam sweeping scheduling block scheduling a dynamic size beam sweeping resource for transmission of common control information via the set of one or more beams; and transmitting, by a first relay node to a second relay node, a beam sweeping scheduling block corresponding to the synchronization signal block, via the set of one or more beams, the beam sweeping scheduling block scheduling a dynamic size beam sweeping resource for transmission of common control information via the set of one or more beams.

Embodiment 12: An apparatus comprising at least one processor and at least one memory including computer instructions, when executed by the at least one processor, cause the apparatus to perform a method of any of embodiments 1-11.

Embodiment 13: An apparatus comprising means for performing the method of any of embodiments 1-12.

Embodiment 14: According to an example implementation, a computer program product includes a non-transitory computer-readable storage medium and storing executable code that, when executed by at least one data processing apparatus, is configured to cause the at least one data processing apparatus to perform a method of any of embodiments 1-11.

Embodiment 15: An apparatus comprising at least one processor and at least one memory including computer instructions, when executed by the at least one processor, cause the apparatus to: transmit, in a wireless network, a synchronization signal block via a set of one or more beams; and, transmit a beam sweeping scheduling block corresponding to the synchronization signal block, via the set of one or more beams, the beam sweeping scheduling block scheduling a dynamic size beam sweeping resource for transmission of common control information via the set of one or more beams.

Embodiment 16: According to an example implementation of any of embodiment 15, wherein the synchronization signal block comprises at least synchronization signals and beam specific reference signals associated with each beam of the set of one or more beams.

Embodiment 17: According to an example implementation of any of embodiments 15-16, wherein the beam sweeping scheduling block is part of a sweeping downlink control channel.

Embodiment 18: According to an example implementation of any of embodiments 15-17, wherein the beam sweeping scheduling block comprises at least one of the following: information identifying the dynamic size beam sweeping resource; information identifying a start of the dynamic size beam sweeping resource; and information identifying a size of the dynamic size beam sweeping resource.

Embodiment 19: The apparatus of any of embodiments 15-18, and further causing the apparatus to: transmit the common control information via the set of one or more beams and the dynamic size beam sweeping resource.

Embodiment 20: According to an example implementation of any of embodiments 15-19: wherein causing the apparatus to transmit the synchronization signal block comprises causing the apparatus to transmit a first synchronization signal block via a first set of one or more beams and a second synchronization signal block via a second set of one or more beams; and wherein causing the apparatus to transmit a beam sweeping scheduling block comprises: causing the apparatus to transmit a first beam sweeping scheduling block corresponding to the first synchronization signal block, via the first set of one or more beams, the first beam sweeping scheduling block scheduling a first dynamic size beam sweeping resource for transmission of common control information via the first set of one or more beams; and causing the apparatus to transmit a second beam sweeping scheduling block corresponding to the second synchronization signal block, via the second set of one or more beams, the second beam sweeping scheduling block scheduling a second dynamic size beam sweeping resource for transmission of common control information via the second set of one or more beams.

Embodiment 21: According to an example implementation of any of embodiments 15-20, wherein causing the apparatus to transmit the synchronization signal block comprises causing the apparatus to transmit, by a base station to a user device, a first synchronization signal block via a first set of one or more beams and a second synchronization signal block via a second set of one or more beams; and wherein causing the apparatus to transmit a beam sweeping scheduling block comprises: causing the apparatus to transmit, by the base station, a first beam sweeping scheduling block corresponding to the first synchronization signal block, via the first set of one or more beams, the first beam sweeping scheduling block scheduling a first dynamic size beam sweeping resource for transmission of common control information via the first set of one or more beams; and causing the apparatus to transmit, by the base station, a second beam sweeping scheduling block corresponding to the second synchronization signal block, via the second set of one or more beams, the second beam sweeping scheduling block scheduling a second dynamic size beam sweeping resource for transmission of common control information via the second set of one or more beams.

Embodiment 22: According to an example implementation of any of embodiments 15-21, wherein causing the apparatus to transmit a synchronization signal block comprises causing the apparatus to perform at least one of the following: transmit, by a base station to a user device in a wireless network, a synchronization signal block via a set of one or more beams; transmit, by a base station to a relay node in a wireless network, a synchronization signal block via a set of one or more beams; transmit, by a relay node to a user device in a wireless network, a synchronization signal block via a set of one or more beams; and transmit, by a first relay node to a second relay node in a wireless network, a synchronization signal block via a set of one or more beams.

Embodiment 23: According to an example implementation of any of embodiments 15-22, wherein causing the apparatus to transmit a beam sweeping scheduling block comprises causing the apparatus to perform at least one of the following: transmit, by a base station to a user device, a beam sweeping scheduling block corresponding to the synchronization signal block, via the set of one or more beams, the beam sweeping scheduling block scheduling a dynamic size beam sweeping resource for transmission of common control information via the set of one or more beams; transmit, by a base station to a relay node, a beam sweeping scheduling block corresponding to the synchronization signal block, via the set of one or more beams, the beam sweeping scheduling block scheduling a dynamic size beam sweeping resource for transmission of common control information via the set of one or more beams; transmit, by a relay node to a user device, a beam sweeping scheduling block corresponding to the synchronization signal block, via the set of one or more beams, the beam sweeping scheduling block scheduling a dynamic size beam sweeping resource for transmission of common control information via the set of one or more beams; and transmit, by a first relay node to a second relay node, a beam sweeping scheduling block corresponding to the synchronization signal block, via the set of one or more beams, the beam sweeping scheduling block scheduling a dynamic size beam sweeping resource for transmission of common control information via the set of one or more beams.

Figure 6:
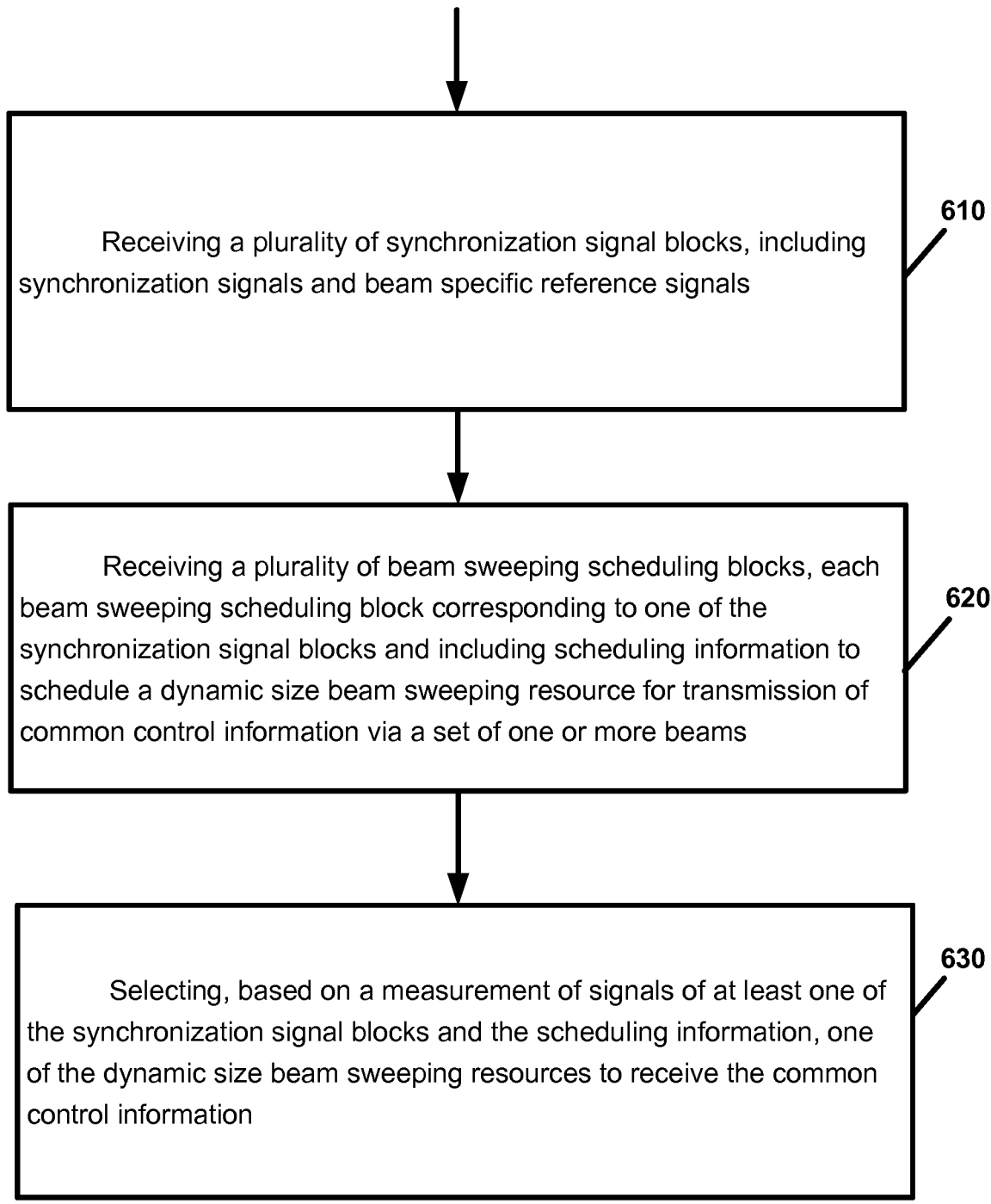
FIG. 6 is a flow chart illustrating operation of a node or device according to another example implementation.

Embodiment 24: FIG. 6 is a flow chart illustrating operation of a device or node according to another example implementation. Operation 610 includes receiving a plurality of synchronization signal blocks, including synchronization signals and beam specific reference signals. Operation 620 includes receiving a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams. And, operation 630 includes selecting, based on a measurement of signals of at least one of the synchronization signal blocks and the scheduling information, one of the dynamic size beam sweeping resources to receive the common control information.

Embodiment 25: According to an example implementation of embodiment 24, and further comprising: receiving the common control information via the selected dynamic size beam sweeping resource (s).

Embodiment 26: According to an example implementation of embodiment 24, and further comprising: receiving, by a user device from a base station, the common control information via the selected dynamic size beam sweeping resource(s).

Embodiment 27: According to an example implementation of any of embodiments 24-26, wherein the beam sweeping scheduling block is part of a sweeping downlink control channel.

Embodiment 28: According to an example implementation of any of embodiments 24-27, wherein the beam sweeping scheduling block comprises at least one of the following: information identifying the dynamic size beam sweeping resource; information identifying a start of the dynamic size beam sweeping resource; and information identifying a size of the dynamic size beam sweeping resource.

Embodiment 29: According to an example implementation of any of embodiments 24-28, wherein the common control information comprises at least one of: paging data; and system information.

Embodiment 30: According to an example implementation of any of embodiments 24-29, comprising: receiving, by a user device from a base station, a plurality of synchronization signal blocks, including synchronization signals and beam specific reference signals; and receiving, by the user device, a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams.

Embodiment 31: According to an example implementation of any of embodiments 24-30, wherein the receiving a plurality of synchronization signal blocks comprises at least one of: receiving, by a user device from a base station, a plurality of synchronization signal blocks, including synchronization signals and beam specific reference signals; receiving, by a user device from a relay node, a plurality of synchronization signal blocks, including synchronization signals and beam specific reference signals; receiving, by a relay node from a base station, a plurality of synchronization signal blocks, including synchronization signals and beam specific reference signals; and receiving, by a first relay node from a second relay node, a plurality of synchronization signal blocks, including synchronization signals and beam specific reference signals.

Embodiment 32: According to an example implementation of any of embodiments 24-31, wherein the receiving a plurality of beam sweeping scheduling blocks comprises at least one of: receiving, by a user device from a base station, a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams; receiving, by a user device from a relay node a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams; receiving, by a relay node from a base station, a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams; and receiving, by first relay node from a second relay node, a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams.

Embodiment 33: An apparatus comprising at least one processor and at least one memory including computer instructions, when executed by the at least one processor, cause the apparatus to perform the method of any of embodiments 24-32.

Embodiment 34: A computer program product, the computer program product comprising a computer-readable storage medium and storing executable code that, when executed by at least one data processing apparatus, is configured to cause the at least one data processing apparatus to perform a method of any of embodiments 24-32.

Embodiment 35: An apparatus comprising means for performing the method of any of embodiments 24-32.

Embodiment 36: An apparatus comprising at least one processor and at least one memory including computer instructions, when executed by the at least one processor, cause the apparatus to: receive a plurality of synchronization signal blocks, including synchronization signals and beam specific reference signals; receive a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams; and select, based on a measurement of signals of at least one of the synchronization signal blocks and the scheduling information, one of the dynamic size beam sweeping resources to receive the common control information.

Embodiment 37: The apparatus of embodiment 36 and further causing the apparatus to: receive the common control information via the selected dynamic size beam sweeping resource(s).

Embodiment 38: The apparatus of embodiment 37, and further causing the apparatus to: receive, by a user device from a base station, the common control information via the selected dynamic size beam sweeping resource(s).

Embodiment 39: The apparatus of any of embodiments 36-38, wherein the beam sweeping scheduling block is part of a sweeping downlink control channel.

Embodiment 40: The apparatus of any of embodiments 36-39, wherein the beam sweeping scheduling block comprises at least one of the following: information identifying the dynamic size beam sweeping resource; information identifying a start of the dynamic size beam sweeping resource; and information identifying a size of the dynamic size beam sweeping resource.

Embodiment 41: The apparatus of any of embodiments 36-40, wherein the common control information comprises at least one of: paging data; and system information.

Embodiment 42: The apparatus of any of embodiments 36-41, comprising causing the apparatus to: receive, by a user device from a base station, a plurality of synchronization signal blocks, including synchronization signals and beam specific reference signals; and receive, by the user device, a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams.

Embodiment 43: The apparatus of any of embodiments 36-42, wherein causing the apparatus to receive a plurality of synchronization signal blocks comprises causing the apparatus to perform at least one of the following: receive, by a user device from a base station, a plurality of synchronization signal blocks, including synchronization signals and beam specific reference signals; receive, by a user device from a relay node, a plurality of synchronization signal blocks, including synchronization signals and beam specific reference signals; receive, by a relay node from a base station, a plurality of synchronization signal blocks, including synchronization signals and beam specific reference signals; and receive, by a first relay node from a second relay node, a plurality of synchronization signal blocks, including synchronization signals and beam specific reference signals.

Embodiment 44: The apparatus of any of embodiments 36-43, wherein causing the apparatus to receive a plurality of beam sweeping scheduling blocks comprises causing the apparatus to perform at least one of the following: receive, by a user device from a base station, a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams; receive, by a user device from a relay node a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams; receive, by a relay node from a base station, a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams; and receive, by first relay node from a second relay node, a plurality of beam sweeping scheduling blocks, each beam sweeping scheduling block corresponding to one of the synchronization signal blocks and including scheduling information to schedule a dynamic size beam sweeping resource for transmission of common control information via a set of one or more beams.

Figure 7:
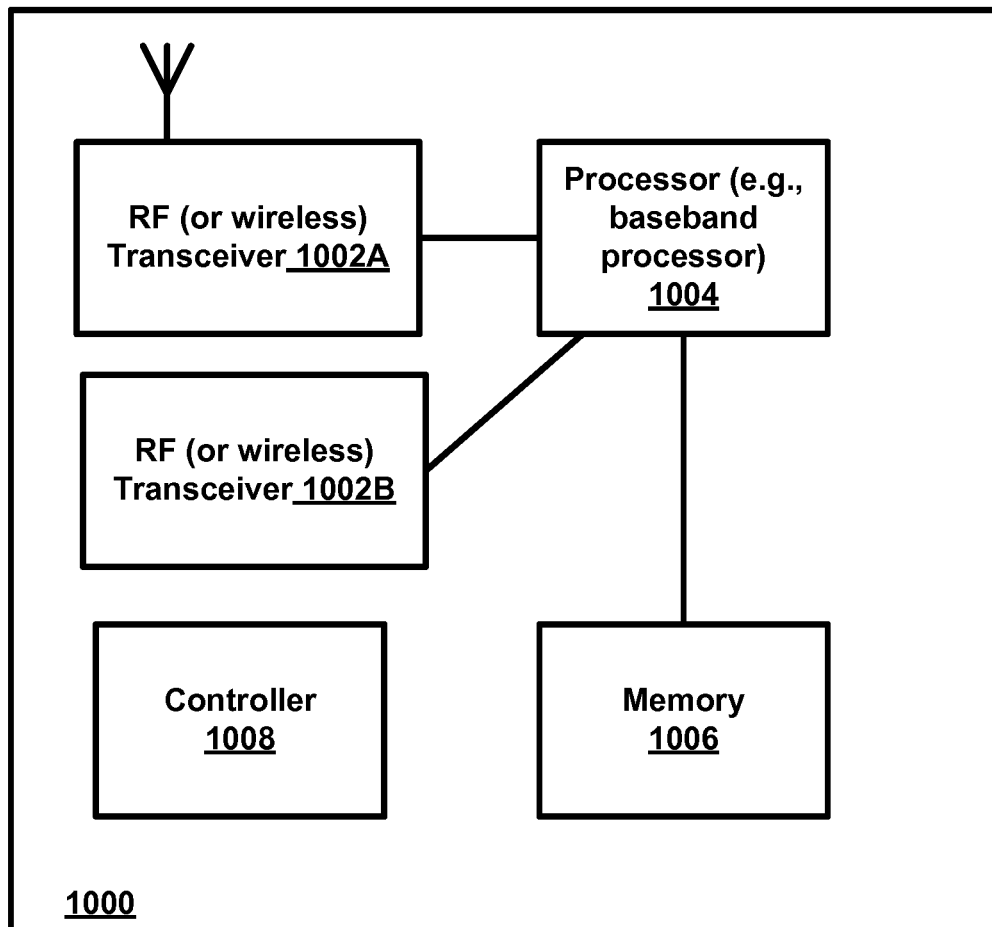
FIG. 7 is a block diagram of a node or wireless station (e.g., base station/access point or mobile station/user device) according to an example implementation.

FIG. 7 is a block diagram of a wireless station (e.g., AP or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 5\1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 7, a controller (or processor) 1008 may execute software and instructions, and may provide overall control for the station 1000, and may provide control for other systems not shown in FIG. 7, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004

(and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   transmitting, in a wireless network, a synchronization signal block via a set of multiple beams; and
   transmitting multiple beam sweeping scheduling blocks corresponding to the synchronization signal block, via the set of multiple beams, the beam sweeping scheduling blocks scheduling a dynamic size beam sweeping resource for transmission of paging data via the set of multiple beams and scheduling, for each beam sweeping scheduling block, different sized beam sweeping mini-slots for transmission of paging data.

2. The method of claim 1, wherein a presence of the dynamic size beam sweeping resource depends on the beam sweeping scheduling block.

3. The method of claim 1, wherein the beam sweeping scheduling block, which corresponds to the synchronization signal block, is transmitted as part of the synchronization signal block, or is time division multiplexed or frequency division multiplexed with the synchronization signal block.

4. The method of claim 1 wherein the synchronization signal block comprises at least synchronization signals and beam specific reference signals associated with each beam of the set of multiple beams.

5. The method of claim 1 wherein the beam sweeping scheduling block is part of a sweeping downlink control channel.

6. The method of claim 1 wherein the beam sweeping scheduling block comprises at least one of the following:
   information identifying the dynamic size beam sweeping resource;
   information identifying a start of the dynamic size beam sweeping resource; and
   information identifying a size of the dynamic size beam sweeping resource.

7. The method of claim 1 and further comprising:
   transmitting, by a base station to a user device, the paging data via the set of multiple beams and the dynamic size beam sweeping resource.

8. The method of claim 1:
   wherein the transmitting the synchronization signal block comprises transmitting a first synchronization signal block via a first set of multiple beams and a second synchronization signal block via a second set of multiple beams; and
   wherein the transmitting a beam sweeping scheduling block comprises:
   transmitting a first beam sweeping scheduling block corresponding to the first synchronization signal block, via the first set of multiple beams, the first beam sweeping scheduling block scheduling a first dynamic size beam sweeping resource for transmission of the paging data via the first set of multiple beams; and
   transmitting a second beam sweeping scheduling block corresponding to the second synchronization signal block, via the second set of multiple beams, the second beam sweeping scheduling block scheduling a second dynamic size beam sweeping resource for transmission of the paging data via the second set of multiple beams.

9. The method of claim 1, wherein the transmitting a synchronization signal block comprises at least one of the following:
   transmitting, by a base station to a user device in a wireless network, a synchronization signal block via a set of multiple beams;
   transmitting, by a base station to a relay node in a wireless network, a synchronization signal block via a set of multiple beams;
   transmitting, by a relay node to a user device in a wireless network, a synchronization signal block via a set of multiple beams; and
   transmitting, by a first relay node to a second relay node in a wireless network, a synchronization signal block via a set of multiple beams.

10. The method of claim 1, wherein the transmitting a beam sweeping scheduling block comprises at least one of the following:
    transmitting, by a base station to a user device, a beam sweeping scheduling block corresponding to the synchronization signal block, via the set of multiple beams, the beam sweeping scheduling block scheduling a dynamic size beam sweeping resource for transmission of the paging data via the set of multiple beams;
    transmitting, by a base station to a relay node, a beam sweeping scheduling block corresponding to the synchronization signal block, via the set of multiple beams, the beam sweeping scheduling block scheduling a dynamic size beam sweeping resource for transmission of the paging data via the set of multiple beams;
    transmitting, by a relay node to a user device, a beam sweeping scheduling block corresponding to the synchronization signal block, via the set of multiple beams, the beam sweeping scheduling block scheduling a dynamic size beam sweeping resource for transmission of the paging data via the set of multiple beams; and
    transmitting, by a first relay node to a second relay node, a beam sweeping scheduling block corresponding to the synchronization signal block, via the set of multiple beams, the beam sweeping scheduling block scheduling a dynamic size beam sweeping resource for transmission of the paging data via the set of multiple beams.

11. The method of claim 1, wherein the paging data transmitted via the multiple beams have variable size.

12. The method of claim 1, wherein the mini-slot is scheduled outside a downlink control channel region in a slot that includes the mini-slot.

13. The method of claim 1, wherein multiple mini-slots for the paging data are scheduled within a same slot.

14. The method of claim 1, further comprising including, in a sweeping downlink control channel, a start time of a mini-slot for the paging data.

15. The method of claim 1, wherein at least one of the mini-slots includes downlink data.

16. The method of claim 1, wherein at least one of the mini-slots does not include a downlink control channel portion.

17. A method comprising:
waking from an inactive state and receiving a plurality of synchronization signal blocks, including synchronization signals and beam specific reference signals;
receiving a plurality of beam sweeping scheduling blocks, each beam sweeping scheduling block corresponding to one of the synchronization signal blocks and including scheduling information to schedule a dynamic size beam sweeping resource for transmission of paging data via a set of multiple beams; and
selecting, based on a measurement of signals of at least one of the synchronization signal blocks and the scheduling information, one of the dynamic size beam sweeping resources to receive the paging data.

18. The method of claim 17 and further comprising:
receiving the paging data via the selected dynamic size beam sweeping resources.

19. The method of claim 17, comprising:
receiving, by a user device from a base station, a plurality of synchronization signal blocks, including synchronization signals and beam specific reference signals; and
receiving, by the user device, a plurality of beam sweeping scheduling blocks, each beam sweeping scheduling block corresponding to one of the synchronization signal blocks and including scheduling information to schedule a dynamic size beam sweeping resource for transmission of the paging data via a set of multiple beams.

* * * * *